May 31, 1955     M. PERLMAN     2,709,427
HUMIDIFIER FOR AIR HEATING FURNACES
Filed April 21, 1951
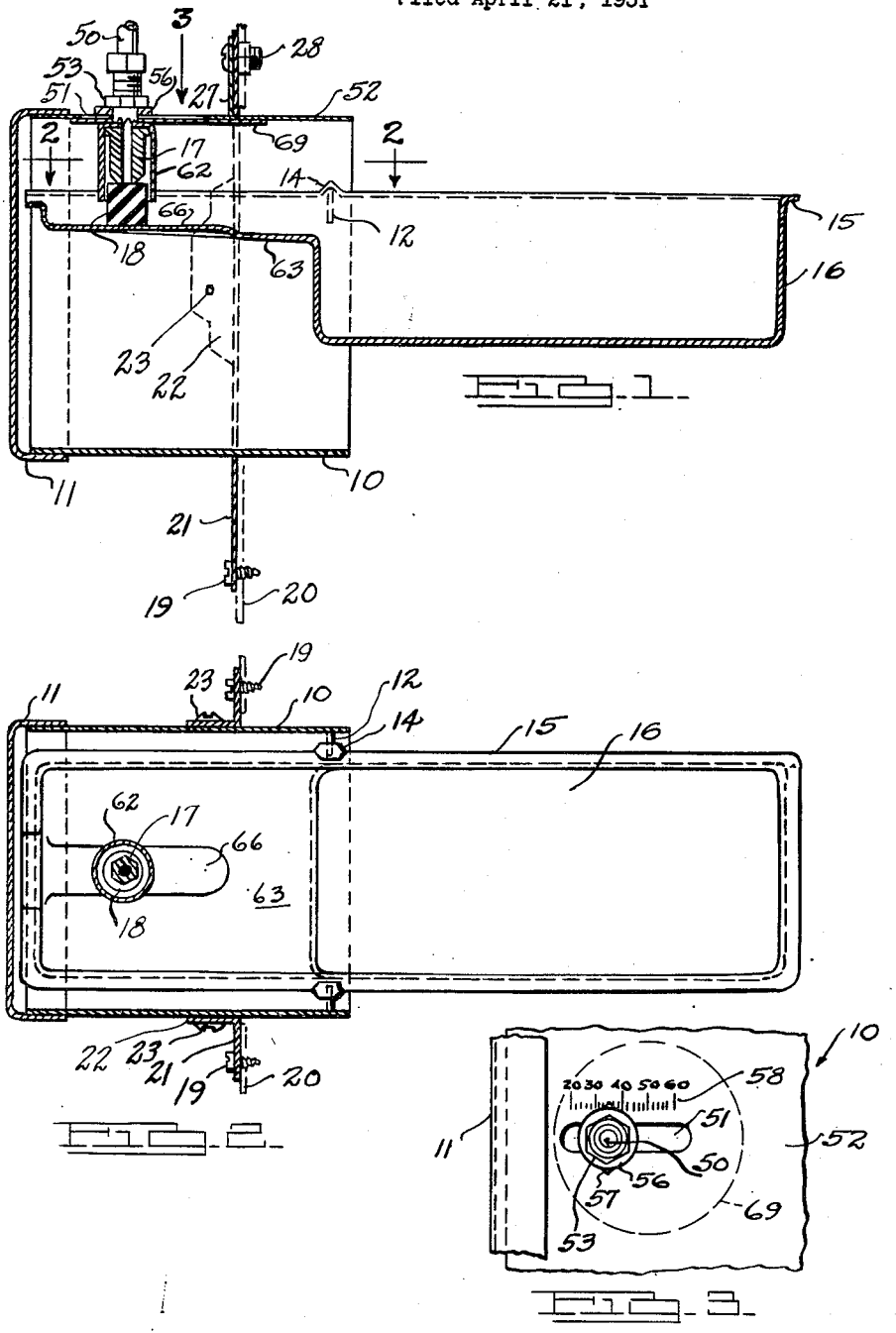
INVENTOR.
Milton Perlman
BY Daniel G. Cullen
Attorney.

United States Patent Office 2,709,427
Patented May 31, 1955

2,709,427

HUMIDIFIER FOR AIR HEATING FURNACES

Milton Perlman, Detroit, Mich.

Application April 21, 1951, Serial No. 222,240

6 Claims. (Cl. 126—113)

This application relates to tiltable pan humidifiers, an example of which is shown in the patent to Perlman, 2,588,567 of March 11, 1952.

This application is a continuation in part of application Serial No. 150,880 filed March 21, 1950, and now Patent No. 2,588,567 of March 11, 1952.

One object of the present invention is to provide a tiltable pan humidifier wherein the water inlet is adjustable towards and away from the tilting axis of the humidifier pan for varying the lever arm of the water pressure force in order to compensate for varying water pressures available in various localities.

Other objects of the invention will become apparent by reference to the following detailed description taken in connection with the accompanying drawing in which:

Fig. 1 is a longitudinal vertical section view of a humidifier embodying the invention mounted on and through a vertical wall.

Fig. 2 is a horizontal section view as if on line 2—2 of Fig. 1.

Fig. 3 is a horizontal fragmentary plan view as if in the direction of the arrow 3 of Fig. 1.

Referring to the drawing, it will be observed that it shows a pan support 10 in the form of a hollow box having open forward and rear ends with the open forward end being closed by a removable snap-on cover 11. The vertical sides of the box are formed with lugs 12 whose upper edges provide pivotal bearings for V-shaped formations 14 of the horizontal flange 15 of a water pan or reservoir 16 whereby the latter is removably and pivotally mounted in the support 10 on a horizontal transverse axis between the longitudinally spaced ends of the pan.

At 17 is shown a nozzle of a water supply line 50 connected to the top wall of the support forward of the pivotal axis 12—14.

The pan 16 tilts and balances itself on its pivot axis 12—14 according to the quantity of water in the rear end of such pan. When the pan is full, a stopper 18 in the forward end of the pan engages the lower end of the nozzle 17 of the water line to close it. Conversely when the pan is not adequately filled, water pressure in the line 17 will tilt the pan counterclockwise to open the nozzle and admit water. This is characteristic of the action of a tilting pan humidifier.

The pan is removably mounted within the box support on its pivot axis 12—14 with acccess into the box support for such purpose being provided by the removal of the snap-on cover 11 closing the forward end of the box.

For mounting the box 10, there is provided a mounting means adapted to be secured by screws 19 against a wall 20 of a furnace or duct and for thus mounting the support in a hole of that wall. Such mounting comprises a U-shaped mounting plate 21 extending along the bottom and sides of the box support and having lugs 22 connected to the sides of the box by screws 23 in holes of lugs 22, with the free ends of the U-shaped plate extending above the box support. An anchor plate 27 bridges and is connected to the upper ends of the sides of the mounting plate 21 by screws 28 and thus clamps the support 10 to the mounting plate for mounting of the support 10 in the mounting plate and in turn in the wall 20.

*Adjustment of nozzle*

The tilting of the pan is responsive to the counter-balancing of certain moments. One of them is due to the weight of the water in the rear end of the pan 16 and the lever arm for this force is constant. The other balancing moment is due to the water pressure available at nozzle 17 from inlet line 50.

Inasmuch as water pressure in various localities differs there is provided here an adjustment for enabling longitudinal movement of the nozzle 17 and the line 50 towards and away from the axis 12—14 of the pan and for thus varying the lever arm for such force, namely the distance between the nozzle 17 and the axis 12—14, to compensate for varying water pressures and maintain constant the predetermined counter-balancing water pressure moment.

The adjustment is obtained by providing a longitudinal slot 51 in the top wall 52 of the support 10 with a suitable nut 53 clamping the nozzle 17 and the line 50 in any adjusted position in such slot.

An indicator plate 56 having pointed ends 57 is carried by the inlet line and indicates, on a marked scale 58 formed on the top wall 52 of the support 10, the adjusted position of the line 50 and the nozzle 17.

In order that the stopper 18 maintain its predetermined relation to the nozzle 17, the nozzle itself is provided with a cylindrical shield 62 surrounding the stopper 18 whereby longitudinal movement of the nozzle and the line 50 is accompanied by corresponding movement of the stopper 18.

The forward end 63 of the pan slopes somewhat so that water flow from line 50 to nozzle 17 is directed into the rear end of the pan 16. However, a level plateau 66 is formed in the pan portion 63 which is non-sloping, that is to say, horizontal, and thus forms a horizontal table for the nozzle 18 in its longitudinal movement and thus insures proper sealing by the stopper 18 against the nozzle 17.

For closing the slot 51 at all times, there is provided an eccentric plate 69 carried by the nozzle and underlying the top wall 52 of the pan support 10 which can be shifted in accordance with the movement of the line 50 and the nozzle 17 for maintaining the slot 51 closed at all times regardless of the position of the nozzle 17 with respect to the slot.

Now having described the humidifier herein disclosed, reference should be had to the claims which follow.

I claim:

1. A humidifier comprising a support, a reservoir having a forward end and a rearward end pivotally mounted on said support, said reservoir being pivotally balanced to pivot downwardly at its forward end when relatively empty and upwardly at its forward end when relatively more full, a nozzle carried by said support and communicating with the forward end of said reservoir through which liquid under pressure is constantly available to fill said reservoir, and means carried by said reservoir adapted to shut off the flow of liquid through said nozzle responsive to the upward tilting of said forward end when said reservoir is full, said nozzle being adjustable toward and away from the pivot point of said reservoir.

2. A humidifier comprising a support having an open rear end, means for mounting it horizontally part way through a wall, a longitudinally extending horizontally disposed open top reservoir having a forward end and a rearward end and pivotally supported and balanced between its ends in said support on a horizontal axis transverse to the longitudinal axis passing through said ends to pivot downwardly at its forward end when relatively empty and upwardly at its said forward end when filled, a nozzle movably mounted in the top of a forward end of said support above the forward end of said reservoir for movement to and from said pivot axis through which water under pressure is continuously available from a water supply source to fill said reservoir, means for fixing said nozzle in a selected position in said support to compensate for variation in water pressure reaction between said nozzle and said reservoir as a result of different water supply pressures encountered at different installations, and means carried by the forward end of said reservoir for contacting said nozzle and shutting off water supplied to the reservoir therethrough responsive to the upward tilting of the forward end of said reservoir when said reservoir is filled.

3. A humidifier comprising a support having an open rear end, means for mounting it horizontally part way through a wall, a longitudinally extending horizontally disposed open top reservoir having a forward end and a rearward end and pivotally supported and balanced on a horizontal axis transverse to the longitudinal axis passing through said ends to pivot downwardly at its forward end when relatively empty and upwardly at its said forward end when filled, a nozzle movably mounted in said support above the forward end of said reservoir for movement to and from said pivot axis through which water under pressure is continuously available from a water supply source to fill said reservoir, means for fixing said nozzle in a selected position in said support to compensate for variation in water pressure reaction between said nozzle and said reservoir as a result of different water supply pressures encountered at different installations, a guide disposed in spaced relationship around said nozzle and depending below the lower end thereof, and a valve block carried by the forward end of said reservoir in free longitudinally slidable relationship thereto and maintained in nozzle shut-off relationship below said nozzle by said guide, said valve block contacting said nozzle and shutting off water supplied to the reservoir therethrough responsive to the upward tilting of the forward end of said reservoir when said reservoir is filled.

4. A humidifier comprising a support having an open rear end, means for mounting it horizontally part way through a wall, a longitudinally extending horizontally disposed open top reservoir having a forward end and a rearward end and pivotally supported and balanced between its ends in said support on a horizontal axis transverse to the longitudinal axis passing through said ends to pivot downwardly at its forward end when relatively empty and upwardly at its said forward end when filled, a nozzle movably mounted in the top of the forward end of said support above the forward end of said reservoir for movement to and from said pivot axis through which water under pressure is continuously available from a water supply source to fill said reservoir, means for fixing said nozzle in a selected position in said support to compensate for variation in water pressure reaction between said nozzle and said reservoir as a result of different water supply pressures encountered at different installations, and means carried by the forward end of said reservoir for contacting said nozzle and shutting off water supplied to the reservoir therethrough responsive to the upward tilting of the forward end of said reservoir when said reservoir is filled, the pivotal support for said reservoir in said header box comprising transversely alined fulcrums in said header box, with said reservoir having transversely alined locator supports resting on said fulcrums.

5. A tiltable reservoir pan type humidifier comprising a support, means for mounting it on a wall at an opening thereof, with said support having a forward portion adapted to be outside said wall when the support is mounted on said wall, a longitudinally extending reservoir pan having a rearward end adapted to extend horizontally through said opening and a forward end lying under the forward portion of the support, cooperating laterally alined formations of the support and the pan between the ends of the pan providing a horizontal pivotal mounting of the pan under the support as well as relatively interconnecting the pan and the support, with the pivot axis being lateral of the pan, whereby the two ends of the pan form lever arms on opposite sides of the pivot axis, a downwardly opening water line nozzle in the forward portion of said support above the forward end of the pan, and a nozzle stopper carried by the forward end of the pan for engaging and closing the nozzle when the rearward end of the pan tilts downwardly, adjustment means for said nozzle to compensate for varying water pressure reactions at said nozzle comprising a slot in the forward portion of said support extending longitudinally thereof and of the pan and perpendicular to the pivot axis of the pan, and externally accessible manually movable means for fixing the nozzle at any selected point of said slot, with the nozzle being movable in said slot for adjustment towards or away from said pivot axis to vary the lever arm ratio of the two ends of the pan.

6. A humidifier pan supporting structure wherein no connections are made to the pan so that the pan is easily mounted and dismounted, comprising an open-ended support mountable on a heating system duct wall so as to extend therethrough, a downwardly projecting water nozzle jet connected on said support at the top thereof and at a point thereon adjacent the outer end thereof constituting a limit stop, pivots on said support at either side thereof and at a point thereon adjacent the inner end thereof constituting fulcrum points, a water pan resting on top of said pivots having its inside end cantilevered past the inside end of said support in a condition of unbalance and its outside end abutted under said jet pressing upwardly thereagainst so as to anchor said pan in its projecting position; said pan being easily insertable in and mountable on said support by resting said pan on said pivots and allowing said pan to abut said jet; said pan being easily removable and demountable from said support by displacing said pan from said jet and lifting said pan off said pivots; said pan having a water reservoir portion substantially inwardly of said pivots and a water trough portion substantially outwardly of said pivots under said jet portion, and a stopper on said trough portion under said jet adapted to forceably cover said jet to prevent water emitting therefrom when said reservoir portion is substantially full due to the weight of the water on the opposite side of said pivots urging said trough portion upwardly thereagainst; said jet and stopper being movable toward and away from said pivots and relative to said pan to adjust the leverwise pressure exerted by said pan when full of water against said jet via said trough to suit high or low water pressure force supplying water to said jet so that said jet is stopped when said pan reservoir portion is substantially full.

References Cited in the file of this patent

UNITED STATES PATENTS

| Number | Name | Date |
| --- | --- | --- |
| 1,720,241 | Sallada | July 9, 1929 |
| 1,778,573 | Thiele | Oct. 14, 1930 |
| 1,958,224 | Anderson | May 8, 1934 |
| 2,292,407 | Skerritt | Aug. 11, 1942 |
| 2,557,042 | Woolley | June 12, 1951 |
| 2,565,210 | Dovolis | Aug. 21, 1951 |
| 2,569,512 | Bottum | Oct. 2, 1951 |
| 2,573,158 | Muth | Oct. 30, 1951 |